United States Patent [19]

Cohen et al.

[11] Patent Number: 4,946,732
[45] Date of Patent: Aug. 7, 1990

[54] INSULATION WITH TAPE ADHERING SURFACE

[75] Inventors: Lewis S. Cohen, Hingham, Mass.; Ivan Rodrigues, North Providence, R.I.

[73] Assignee: Venture Tape Corp., Rockland, Mass.

[21] Appl. No.: 292,766

[22] Filed: Jan. 3, 1989

Related U.S. Application Data

[62] Division of Ser. No. 96,660, Sep. 15, 1987, Pat. No. 4,842,908.

[51] Int. Cl.$^5$ ................................................ C09J 7/02
[52] U.S. Cl. .................................... 428/192; 428/343; 428/351; 428/481
[58] Field of Search ................ 428/343, 351, 352, 40, 428/192, 481

[56] References Cited

U.S. PATENT DOCUMENTS

| | | | |
|---|---|---|---|
| 2,561,362 | 7/1951 | Guillot | 428/351 |
| 2,797,731 | 7/1957 | Carlson, Jr. | 156/215 |
| 3,497,383 | 2/1970 | Olyphant, Jr. et al. | 428/209 |
| 3,770,556 | 11/1973 | Evans et al. | 428/194 |
| 3,876,454 | 4/1975 | Snell et al. | 117/122 P |
| 3,941,159 | 3/1976 | Toll | 428/102 |
| 3,957,724 | 5/1976 | Schurb et al. | 260/46.5 E |
| 3,993,833 | 11/1976 | Esmay | 428/311 |
| 4,022,248 | 5/1977 | Hepner et al. | 138/141 |
| 4,028,474 | 6/1977 | Martin | 428/40 |
| 4,060,664 | 11/1977 | McGuire et al. | 428/336 |
| 4,181,765 | 1/1980 | Harmony | 428/343 |
| 4,243,453 | 1/1981 | McClintock | 156/152 |
| 4,287,013 | 9/1981 | Ronning | 428/352 |
| 4,389,270 | 6/1983 | McClintock | 428/352 |
| 4,513,039 | 4/1985 | Esmay | 428/40 |
| 4,522,870 | 6/1985 | Esmay | 428/252 |
| 4,584,217 | 4/1986 | McClintock | 428/40 |
| 4,595,615 | 6/1986 | Cohen | 428/36 |
| 4,605,043 | 8/1986 | Grenier | 428/40 |
| 4,609,957 | 8/1986 | Cohen | 428/40 |
| 4,728,571 | 3/1988 | Clemens et al. | 428/352 |
| 4,775,581 | 10/1988 | Siniscalchi | 428/351 |

OTHER PUBLICATIONS

BOSTIK—Preliminary Product Data: BOSCODUR 40, (11/3/86).
BOSTIK—Product Data: BOSTIK 7064/BOSCODUR No. 1, or No. 22, (6/85).
BOSTIK—Product Data: BOSTIK 7064, (9-75).
BOSTIK—Material Safety Data Sheet for BOSTIK ADH 7064, (7/9/86).
BOSTIK—Material Safety Data Sheet for BOSCODUR 40, (1/23/87).
BOSTIK—Product Data: BOSTIK 7205/BOSCODUR No. 1, (11/80).
BOSTIK—BOSTIK 7237/BOSCODUR No. 22, (5/85).
BOSTIK—Preliminary Product Data: BOSLAM 7885.
BOSTIK—Product Data: BOSTIK 7376.
National Starch and Chemical Corporation—Speciality Adhesives—Product Data: DURO-FLEX 30-1278.

*Primary Examiner*—James Siedleck
*Attorney, Agent, or Firm*—Wolf, Greenfield & Sacks

[57] ABSTRACT

Improved insulation segments for fluid conduits such as pipes and ducts, having a nontacky moisture resistant strip which extends along edges of the insulation which are adapted to be secured to other portions of the insulation, or to other insulation segments using a pressure sensitive, adhesive tape. This strip preferably comprises a cured adhesive which bonds to the paper or other surface to which it is applied which provides a good, dry, dirt free, smooth surface to which the pressure sensitive adhesive tape will strongly adhere.

6 Claims, 1 Drawing Sheet

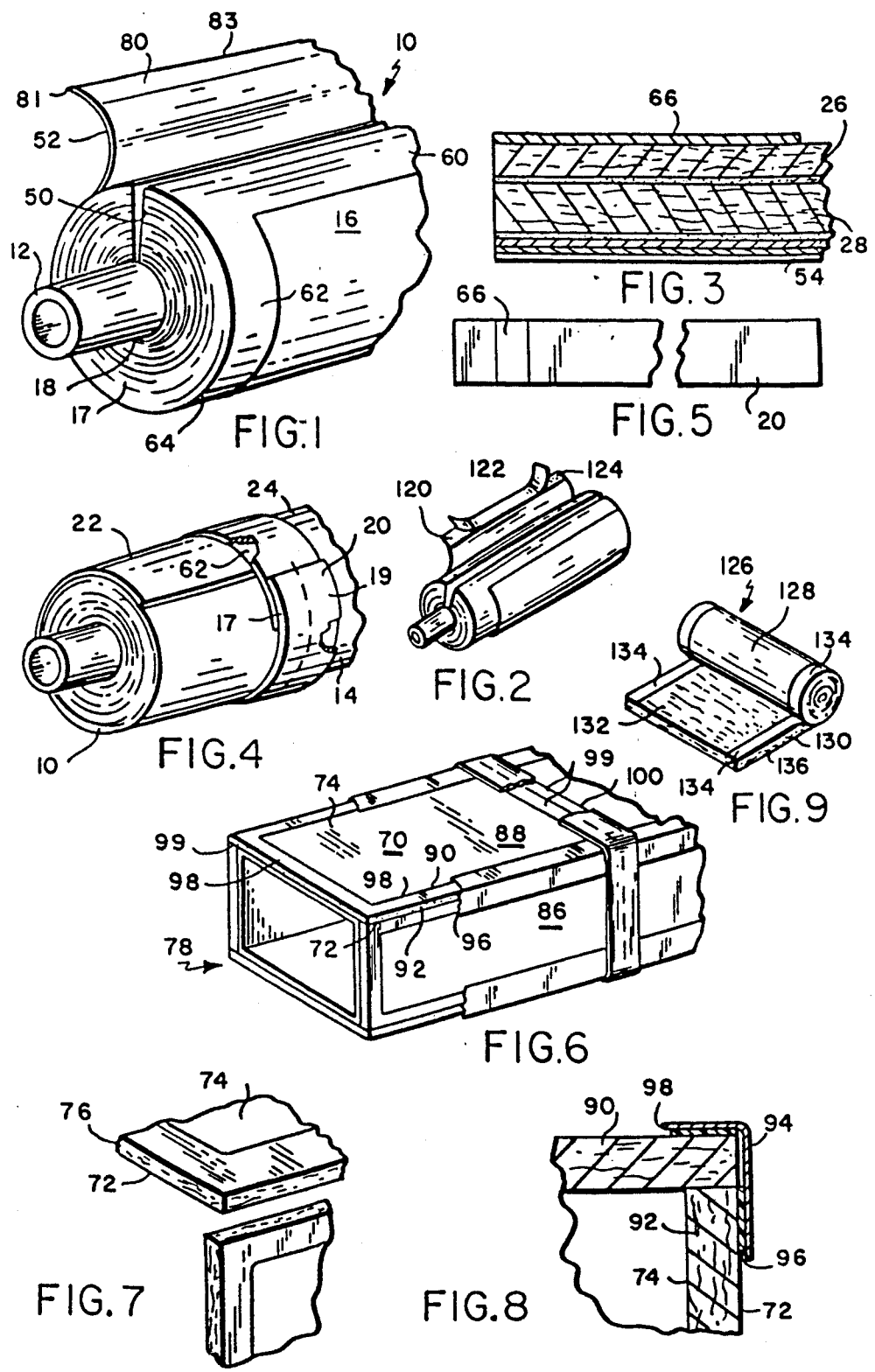

INSULATION WITH TAPE ADHERING SURFACE

This application is a division of application Ser. No. 096,660, filed Sept. 15, 1987, now U.S. Pat. No. 4,842,908.

FIELD OF THE INVENTION

This invention relates generally to insulation for use with fluid conduits such as pipes or ducts, and more particularly to sheets and segments of such insulation which have been provided with a strip of a moisture resistant material for use with pressure sensitive adhesive tapes.

BACKGROUND OF THE INVENTION

Most insulation sheets and segments which are used presently either with pipes or duct work have an exterior coating of paper. For example, as shown in copending U.S. application Ser. No. 804,066 assigned to the assignee herein, cylindrical insulation segments used with pipes typically comprise an inner, metallized layer, a layer of fiberglass yarn, and an outer, paper layer which is typically a kraft paper. The outer layer frequently includes a scrim laminated between paper layers which produces a textured outer surface to the segment. These cylindrical segments extend along a pipe in an end to end abutting relationship. Also, each segment typically is slit along its length for insertion of the pipe, and a proper flap is provided for covering the slit and for sealing the pipe within the segment. The undersurface of the flap is provided with a strip of a pressure sensitive adhesive to allow it to be secured to the outer paper layer of the segment. The spaces between abutting ends of the segments may be sealed using a tape such as a butt strip tape, having a pressure sensitive adhesive. This tape preferably has an outer paper layer, a middle layer of fiberglass, an inner metallized layer, and a layer of a pressure sensitive adhesive disposed on the metallized layer, as described in copending U.S. application Ser. No. 804,066. The tape is wrapped about the abutting ends of the segments so that one end of the tape overlaps the other end to seal the space between the segments.

Often, it is necessary to apply the strip of adhesive to the undersurface of the flap of the insulation segment at the job site. In this instance, the adhesive is provided on a roll using a double sided release paper having a differential release, as described in U.S. application Ser. No. 804,066. Therefore, if the undersurface of the flap has moisture on it at the time of application of the adhesive strip, the adhesive may not bond well to the flap.

In each instance, for both the paper flap and the butt strip tape, the integrity of the seal is a function of the strength of the bond between a pressure sensitive adhesive and a layer of paper, whether it be the tape or the insulation segment. If the tape and flap are sealed in place when the paper layer is dry, and the paper layer never becomes damp through absorption of moisture, the integrity of the seal will be maintained. However, more often than not, especially in new construction, insulation segments are used in basements or areas which are exposed to the weather, where the outer paper layer absorbs moisture from the surrounding environment. Eventually, under such conditions, the paper layer is likely to disintegrate, delaminate or even separate from the fiberglass layer If this disintegration or delamination occurs, the integrity of the seal between the butt strip tape and the segment or between the flap and the segment may be destroyed. Also, because of the textured outer surface, if inadequate pressure is applied to the flap or the tape, the pressure sensitive adhesive will adhere only to the raised portions of the outer surface, which is less than 25% of the total surface area of the segment. Because of this inadequate bond, "fishmouthing" is more likely and the bond between the butt strip tape and the outer surface of the segment is less secure. With respect to the flap seal, such delamination or disintegration can allow the flap to rise off the insulation segment to cause what is known as "fish mouthing". "Fish mouthing" can occur as a result of the breakdown between the adhesive strip and the flap or between the adhesive strip and the outer surface of the segment. Such delamination or disintegration can occur over a period of a few weeks in very damp environments, or a period of many months in less damp environments. Eventually, the insulation segments must be removed and replaced if the desired level of protection is to be maintained. "Fish mouthing" is a particular problem on jobs for the U.S. Government, since such "fish mouthing" does not meet specifications for the U.S. Government, and the contractor may be required to return to the site and repair the damage at his own cost.

Some manufacturers of cylindrical insulation segments provide them with an outer layer of plastic such as polyvinylchloride (PVC). Although the PVC does not delaminate, some difficulty may be experienced in securing either the butt strip tape or the flap to the outer surface of the segment if moisture is present. Also, acrylic adhesives are generally used to seal the flap on the segment and to secure the butt strip tape to the segment, and acrylic adhesives do not adhere well to PVC. Any incomplete seal could result in "fish mouthing" of the flap or eventual failure of the seal around the butt strip tape.

Fibrous duct board is often used for insulation of duct work, particularly square or rectangular ducts. Such duct board is provided in somewhat rigid sheets. This duct board has a structure somewhat similar to that of the pipe insulation segments previously described and generally comprises an outer metallized layer, a middle layer of fiberglass yarns, or mineral wool, and an inner paper layer which is typically a kraft paper. On some duct board products the paper is on the outer surface and the metallized layer is on the inner surface. The fiberglass or mineral wool layer of the duct board is more tightly packed than in the segments, thus providing it with the greater rigidity. The duct board generally is cut to the size of the duct work, and the resulting sheets cover the surfaces of the duct work. Sheets are placed in abutting relationship along each surface, and edges of the sheets on each surface adjoin edges of other sheets disposed on adjacent, perpendicular surfaces of the duct. A pressure sensitive adhesive tape may be used to seal the spaces between abutting and adjoining edges of the duct board. The tape is secured either to the outer surface, either to a metallized layer or to a paper layer. Generally, for adjoining, perpendicular edges of the sheets of duct board, one transverse edge of the tape is applied to an edge of a sheet along one surface, and the tape is then folded along a line parallel to its length so that the other transverse edge of the tape is secured to an edge of a sheet of duct board disposed on an adjoining, perpendicular surface. This fold in the tape occurs across the machine direction of the tape, and therefore the tape resists folding and tends to straighten itself out into its original, generally flat configuration. As a result, a shear stress results between the tape and the outer surfaces, particularly along the adjoining edges between perpendicular sheets of duct board.

The outer layer of such duct board is susceptible to damage resulting from moisture absorbed from the surrounding environment. If moisture is present either in the paper or on the metallized layer when the adhesive tape is applied, or if such moisture is absorbed by the paper at a later time, the integrity of the seal can be compromised. As with the pipe insulation, the paper layer can disintegrate or separate, thus destroying the bond between the tape and the sheet of duct board. Because of the shear stresses along perpendicular junctions, once the outer layer begins to disintegrate or delaminate, the tape has a tendency to pull free from one or the other of the edges of the perpendicularly disposed sheets of duct board, and this tendency accelerates the delamination or disintegration process. Eventually, the integrity of the seal is destroyed. This process is accelerated if a scrim is laminated into the outer layer and the outer layer is textured, as described for the insulation segments. Again, if the duct work is to be properly insulated, the tape, and often all of the sheets of duct board must be replaced.

Flexible blanket insulation is also used for insulation of duct work. Such blanket insulation typically is provided in long rolls from which the insulation is cut and wrapped about the duct work. The structure of such blanket insulation has the same structure, in most instances, as the previously described cylindrical insulation segments and duct board, and comprises an outer metalized layer, a middle layer of fiberglass yarns, which are loosely packed to be flexible, and an inner layer which is typically a kraft paper. As described in copending U.S. application Ser. No. 905,701, filed Sept. 9, 1986, and assigned to the assignee of the present application, adjacent lateral edges of segments of blanket insulation cut from the roll are sealed to one another by the use of strips of tape to effect a seal about the ducts. Again, the outer paper layer of such blanket insulation is susceptible to damage resulting from moisture absorbed from the surrounding environment or from moisture which is already present in the paper when the tape is applied. If disintegration or delamination of the paper layer occurs, the integrity of the seal could be destroyed if the tape pulls loose.

Again, this process would be accelerated if a scrim is used in the outer layer to provide it with a textured surface. In addition, the tape used to seal together the edges of such blanket insulation is secured in an end to end, overlapping relation. The structure of this tape is substantially identical to that of the butt strip tape previously described, and contains an outer, paper layer. Therefore, if moisture is present in the paper layer of such tape, disintegration or delamination again could occur, thus destroying the seal created by the tape.

In each instance, the replacement of insulation after a very short period of time is very expensive and results in additional building costs. If the insulation is not replaced, the effectiveness of the insulation is significantly reduced, and significant monetary losses result from the escape of heat from the pipes or duct work.

It is an object of this invention to provide a moisture proof surface on insulation segments, sheets and blankets, and on tape used to seal such insulation segments, sheets and blankets at locations where a pressure sensitive adhesive tape is to be applied.

It is also an object of this invention to provide superior adhesive bonding surfaces upon which pressure sensitive adhesive tapes may be applied for sealing pipe insulation segments together.

It is a further object of this invention to provide a superior adhesive bonding surface for the pressure sensitive adhesive layer of the flap on a pipe insulation segment.

It is a further object of the present invention to provide a superior adhesive bonding surface on ends of a butt strip tape used for sealing abutting ends of insulation segments on pipes.

It is a further object of the present invention to provide a superior adhesive bonding surface on the perimeter of sheets of duct board used for insulating ducts to permit secure attachment of pressure sensitive adhesive tapes to the edges of the duct board for sealing abutting and adjoining edges to one another.

It is a further object of the present invention to provide a superior adhesive bonding surface on the lateral edges of rolls of blanket insulation used for insulating ducts to permit secure attachment of pressure sensitive adhesive tapes to the lateral edges of the blanket insulation for sealing abutting and adjoining edges to one another.

It is a further object of the present invention to provide a superior adhesive bonding surface on ends of tape used to seal abutting and adjoining edges of blanket insulation to one another.

SUMMARY OF THE INVENTION

The foregoing and other objects of this invention are achieved by the provision of strips of a water resistant, nontacky coating material on the surfaces of the insulation and tapes at points where attachment of a pressure sensitive adhesive is desired. The exact width of the strips depends upon the particular application, but generally should be a little greater than the width of the portion of the adhesive which is to be secured thereto. A three inch width is preferred, although the width, as indicated, can be greater or less than this amount. Preferably, the strip of coating material is applied at the factory when the product is manufactured. The particular coating material used should be one that is moisture resistant, is nonblocking, and, when dried, one that allows pressure sensitive adhesive tapes to adhere readily to it. Also, the coating material should remain flexible at high and low temperatures. The coating material is a cured adhesive system, preferably a linear saturated polyester and polyisocyanate cured adhesive system.

A preferred linear saturated polyester and polyisocyanate adhesive system is a two component solvent based system using Bostik 7064 and Boscodur No. 40. The linear saturated polyester is mixed with the polyisocyanate, blended, applied to the surface and allowed to cure.

With respect to cylindrical pipe insulation segments, a strip of the coating material is applied adjacent the slit which extends axially along the length of the insulation segment where the covering flap is to be secured to the outer surface of the segment. In addition, other strips of the coating material can be disposed around the outer circumference of the segment adjacent each end thereof for attachment of butt strip tape thereto. Finally, if the adhesive layer is applied to the flap on site, a strip of the coating material is deployed on the inside surface of the flap adjacent the outer edge.

The butt strip tape used to seal together abutting ends of the segments is preferably provided in strips of predetermined lengths, and not in a roll, and the strips are sized for the circumference of particular pipe insulation segments. A strip of coating material is disposed at one end of each tape strip and spaced from the end, on the outer, nonadhesive surface thereof, so that as the tape strip is wrapped about the circumference of the pipe insulation segment, a strip of coating material is present at the point where the tape strip is adhered to the outer surface of itself.

This invention also has application to duct board and blanket insulation for heating ducts. The outwardly facing, paper surface of the duct board is provided with a strip of coating material along its outer edges and this strip extends either around the entire perimeter thereof or on only two sides thereof. The strip of coating material allows proper bonding of pressure sensitive adhesive tapes to seal the spaces between the edges of angularly disposed sheets covering the duct, as well as the spaces between abutting ends of sheets disposed on one surface of the duct. The outwardly facing surface of the blanket insulation is provided with a strip of coating material along its lateral edges. The width of the strip depends upon the width of the tape used, but is generally about two to three inches. Tapes used to seal the blanket insulation also are provided in premeasured lengths and have a strip of coating material at one end on their outer surface.

The provision of such a strip of coating material on the insulation material, and on the tapes, prepares the surface thereof so that it will adhere better to the pressure sensitive adhesive tape. The coating material saturates paper so that water cannot penetrate, thus rendering this portion of the paper layer moisture resistant. The coating material also provides a smooth, flat surface to which the adhesive can bond, thus filling in any irregularities on the surface caused by a scrim or the like. The particular material selected is particularly advantageous because it is moisture resistant, flexible, will bond to adhesives, is absorbed by paper, will stick to paper, PVC or a metallized surface, will not adhere to dirt, and has no static cling which will attract dust or other materials.

BRIEF DESCRIPTION OF THE DRAWINGS

The objects, advantages and features of this invention will be more clearly appreciated from the following detailed description when taken in conjunction with the accompanying drawings in which:

FIG. 1 is a partially cut away, perspective view of a pipe insulation segment showing one embodiment of this invention;

FIG. 2 is a perspective view of a pipe insulation segment showing another embodiment of this invention in which the adhesive layer is applied to the flap at the job site;

FIG. 3 is a cross sectional view of a cutaway portion of butt strip tape segment illustrating another embodiment of this invention;

FIG. 4 is a partially cut away, perspective view of a pipe insulation segment showing the butt strip tape of FIG. 3 used in conjunction therewith;

FIG. 5 is a top, planar view of the butt strip tape segment shown in FIG. 3;

FIG. 6 is a partially cut away perspective view showing another embodiment of this invention when used in conjunction with duct board;

FIG. 7 is a partially, cut away, exploded perspective view showing the relationship of the duct board illustrated in FIG. 6;

FIG. 8 is a cross sectional planar view taken along the lines 8—8 of FIG. 6; and FIG. 9 is a perspective view showing a roll of partially unrolled blanket insulation having strip of coating material of the present invention.

DETAILED DESCRIPTION OF THE PREFERRED EMBODIMENT

With reference now to the drawings, and more particularly to FIG. 1 thereof, this invention first will be described with regard to one embodiment thereof when used in conjunction with cylindrical, pipe insulation segments. FIG. 1 shows a portion of an insulation segment 10 installed around pipe 12. Pipe 12 may be any conventional hot or cold water pipe or steam pipe or pipe for carrying chemicals or petroleum products. Pipe 12 can be formed of any conventional material, such as copper, steel, plastic, aluminum or rubber. Segment 10 is comprised of a flame resistant, vapor barrier material. Segment 10 may have an outer layer of a plastic material such as polyvinylchloride (PVC) (not shown) but segment 10 typically comprises an outer flame retardant paper layer 16, a middle layer 17 of fiberglass yarns, and an inner metallized layer 18. Typically, paper layer 16 and metallized layer 18 are secured to opposite sides of fiberglass layer 17 using a flame resistant laminating adhesive. However, the metallized layer can also be disposed between paper layer 16 and layer 17. In one embodiment, metallized layer 18 is a layer of aluminum foil, while in another embodiment, metallized layer 18 is an aluminized polyester film.

Generally, although not always, paper layer 16 is a high intensity, white, chemically treated kraft paper, and the weight of the paper is in the order of 45 pounds per 3000 square feet. Layer 16 may contain an embedded scrim which produces a textured outer surface which has a raised pattern identical to the scrim pattern. Layer 17 typically, although not always, is comprised of fiberglass scrim yarns and has a tridimensional 5 X 5 fiberglass construction. Segment 10 is split along its entire length at slit 50, and slit 50 is adapted to be sealed along its length by a flap 52. Flap 52 typically is an extension of paper layer 16, or if layers 16 and 18 are laminated to form a single unit, flap 52 is an extension of the unit formed by layers 16 and 18.

As shown in FIG. 1, an adhesive strip 80 is provided on the undersurface of flap 52 for sealing of flap 52 to the outside surface of paper layer 16 adjacent slit 50. Strip 80 extends the entire length of flap 52 and is covered with a layer of release paper 81 prior to sealing of the flap. Adhesive strip 80 typically is comprised of a pressure sensitive adhesive, such as an isooctyl acrylate polymer, as described in copending application Ser. No. 804,066.

As previously described, in prior art insulation segments, paper layer 16 has a tendency to absorb moisture from its environment, both before and after sealing of flap 52 thereto. Also, if segment 10 has an outer PVC coating, moisture tends to form on the surface thereof. In prior art segments, if the outer layer is moist at the location adjacent slit 50, adhesive layer 80 is not tightly and optimally secured thereto. In addition, if absorption of moisture occurs after sealing of flap 52 to the outside of segment 10, such moisture can cause layer 16 to begin to disintegrate or delaminate. Flap 52 has a natural tendency, because of its method of manufacture, to tend to open up or lift off its point of attachment. As layer 16 begins to disintegrate or delaminate, flap 52 will rise off the insulation segment, or "fish mouth", taking a portion of layer 16 with it, thus providing an air gap through which heat can enter or escape. "Fish mouthing" is further accelerated if layer 16 has a textured outer surface, because the adhesive may only bond to the 25% of the surface that is raised, if enough pressure is not applied to the adhesive. Also, if the outer surface of segment 10 is formed of PVC, the presence of moisture can also cause flap 52 to "fish mouth."

In this embodiment of the invention, this "fish mouthing" problem is overcome by the provision of a strip 60 of a coating material which extends along nearly the entire length of segment 10 and which is disposed closely adjacent slit 50 on paper layer 16. Strip 60 typically has a width sufficiently great that it extends to the outer edge 83 of flap 52 when flap 52 is folded over slit 50 and is secured to the outer surface of segments 10. Typically, this width is about one and one half to about three inches. In this manner, adhesive layer 80 is secured along its entire length only to strip 60. Strip 60 prepares the surface for the adhesive, and for a paper layer 16, the paper layer all the way down to the laminating adhesive so that water cannot penetrate into layer 16 at the point where flap 52 is secured. A smooth, flat surface is provided to which the adhesive can bond. In this manner, delamination and disintegration of layer 16 adjacent flap 52 are eliminated.

The coating material used for strip 60 preferably is nonblocking when cured and is moisture resistant. Also, it may have the following properties: sufficiently flexible so as not to crack when bent or folded., remains flexible within the range of temperatures from about 150° F. to about −20° F.; of bonding to a pressure sensitive adhesive such as an isooctyl acrylate polymer; capable of being absorbed by paper; capable of adhering to paper, a plastic material such as PVC and metallized surfaces; not capable of adhering to dirt; transparent (although this is not an essential property); and no static cling so it will not attract dust. Materials which can be used for strip 60 are cured, adhesive systems. The preferred material is prepared from a cured, two component, solvent based linear, saturated polyester adhesive system.

Conventional gravure or flexographic equipment may be used for application of the coating material. In an alternative embodiment, a pneumatically pressurized roller tip having a knurled surface can be used to apply the mix in a manner similar to that used with gravure equipment. An example of an acceptable pressurized roller is that manufactured by Aro Corporation, One Aro Center, Bryan, OH. 43506, under Model No. 463122-3. Large knurling is used on the roller to provide the desired amount of adhesive. Typically, the roller is about 3 inches wide. The mixture may also be sprayed on the surface of paper layer 16 using a conventional pneumatically driven spray system. Thereafter, the solution is fully cured to drive off all solvents until the resulting strip 60 is nonblocking. Typically, strip 60 is cured using a conventional drying oven, such as an infrared oven provided with an air flow therethrough. The oven is maintained at a temperature in a range of from about 200° F. to about 250° F.

The following are a number of non-limiting illustrative examples of cured adhesive systems which can be used as a coating material in accordance with this invention:

EXAMPLE 1

A preferred coating material is prepared from a two component, solvent based adhesive system, in which the primary component comprises a linear saturated polyester base and a toluol/methylene chloride solvent. This primary component has about 27% total solids, a Brookfield viscosity of 900 to 1100 CPS, and it has a specific gravity of about 1.1 kilograms per liter. It is light straw in color. Its flash point is 66° F. The other component of this system is a catalyst, and is preferably a polyfunctional aliphatic isocyanate resin dissolved in n butyl acetate/xylene (1:1). The specific gravity of the preferred polyisocyanate compound is 1.06 kilograms per liter and contains approximately 25% + 2% volatiles by weight. Its NCO content is 16.5% to 0.5% and the viscosity is 250 mpa's. The free HDI monomer weight of the catalyst is 0.7% maximum, and the flash point is about 87° F. It is a clear, slightly yellow liquid. Suitable components may be purchased commercially from Bostik Chemical Division of the Emhart Fastener Group, Boston Street, Middleton, MA 01949. A suitable primary component is Bostik 7064, and a suitable catalyst is Boscodur No. 40.

When preparing the coating material for use, the primary component, such as the Bostik 7064, is diluted with methylene chloride or trichlorylethylene until it has a solids content of in the range of from about 28% to 38% by weight. A premix is then formed with the primary component and the catalyst. The primary component constitutes about four parts by volume of the premix, and the catalyst comprises about one part by volume of the premix. This premix is then blended in a known manner, such as by a lightening mixer, until a homogeneous solution is obtained, or until the polyisocyanate is totally in solution. Thereafter, this homogeneous solution is applied wet to the surface of paper layer 16 and cured, all as described above, to form strip 60. Preferably, the solution is applied wet in sufficient amounts so that it will have a dry thickness in the range of from about 1.5 mils to 3.0 mils, and a dry coating weight in the range of from about 1.188 dry ounces per square yard to about 2.376 dry ounces per square yard.

Shear tests were performed in which a strip of material coated with an adhesive, such as an isooctyl acrylate polymer was secured to a material such as that comprising a segment 10 having an outer paper layer 16. One test was performed in which the paper layer was uncoated, and another test was performed in which the paper layer was coated with the cured linear saturated polyester material described herein. A 1 kilogram weight was applied in shear (at an angle of about 180° to the surface of paper layer 16) both to the flaps secured to the coated layer and to the uncoated layer. In each instance, the weight was allowed to be suspended for a 15 minute period at room temperature (70° F.) and then the temperature was elevated to first 100° F., then 150° F., and then 200° F. In test, where no coating was present, the bond failed after 13 hours. For the coated paper, the bond held after 24 hours. When the temperature was raised to 150° F., the bond still held for an additional 72 hours. Finally, when the temperature was raised to 200° F., the bond continued to hold for an additional 110 hours, at which point the test was stopped. The same test was repeated using a 2 kilogram weight in shear. With a 2 kilogram weight, the flap secured to the paper having no coating failed after 6 minutes at room temperature. With respect to the bond using a coating, after 1 hour at room temperature, there was no failure. When the temperature was raised to 100° F., the bond only failed after 27 hours.

EXAMPLE 2

Another acceptable coating material can be prepared from a two component, solvent based adhesive system in which the primary component again comprises a linear saturated polyester base and chlorinated solvents. The total solids content of this primary component is higher than that set forth in Example 1, and is 36%, + 1. The Brookfield viscosity is 3500 CPS+500, and the specific gravity is about 10.72 pounds per gallon (1:29 kilograms per liter). The primary component has no flash point, and is light straw in color. The other component of the system is a catalyst, which is the same catalyst set forth in Example 1. Again, this catalyst is a polyfunctional aliphatic isocyanate resin dissolved in n-butyl acetate-xylene (1:1). Suitable components may be purchased commercially from Bostik Chemical Division of the Emhart Fastener Group, Boston Street, Middleton, MA 01949. A suitable base is Bostik 7205, and a suitable catalyst is Boscodur No. 40. When preparing the coating material for use, a premix is formed in which the primary component constitutes about 20 parts by volume and the catalyst constitutes about one part by volume. In all other respects, this coating material is prepared for use and applied in the same manner as set forth in Example 1.

EXAMPLE 3

Another acceptable coating material can be prepared from a two component, solvent based adhesive system in which the primary component comprises a polyester resin base and methylethylketone and toluol solvents. The primary component has about 43% to 47% total solids, and a Brookfield viscosity of 1000 to 2000 CPS. The primary component has a specific gravity of about 7.95 pounds per gallon (0.95 kilograms per liter), and is light amber in color. The flash point of the primary component is about 18° F. The other component of this system is a catalyst, and is preferably a polyfunctional aliphatic isocyanate resin dissolved in n-butyl acetate/xylene (1:1). This catalyst is identical to that set forth in Example 1. Suitable components may be purchased commercially from Bostik Chemical Division of the Emhart Fastener Group, Boston Street, Middleton, MA 01949. A suitable base is Bostik 7237, and a suitable catalyst is Boscodur No. 40. The primary component is mixed with the catalyst in a ratio of about 20 parts by volume to 1 part by volume for the primary component for the catalyst. In all other respects, this coating material is prepared for use and applied in the same manner as set forth in Example 1.

EXAMPLE 4

Another coating material can be prepared from a two component, solvent based adhesive system in which the primary component comprises a polyester resin base and a methylethylketone solvent. This primary component has about 70% + 1 total solids, a Brookfield viscosity of 3000 CPS + 1000 CPS and a specific gravity of about 9 pounds per gallon. The flash point of the primary component is 16° F. The other component of this system is a catalyst, and is preferably a polyfunctional aliphatic isocyanate resin dissolved in n-butyl acetate/xylene (1:1). This catalyst is identical to that set forth in Example 1. Suitable components may be purchased commercially from Bostik Chemical Division of the Emhart Fastener Group, Boston Street, Middleton, MA 01949. A suitable base is Boslam 7885, and a suitable catalyst is Boscodur No. 40. This primary component is mixed with the catalyst so that the catalyst comprises approximately 10% to 12% of the total mix by weight. In all other respects, this coating material is prepared for use and applied in the same manner as set forth in Example 1.

EXAMPLE 5

Another coating material can be prepared from a single component, solvent based adhesive which comprises a urethane base and a methylethylketone/toluol solvent. This adhesive has about 20% + 1 total solids, a Brookfield viscosity of about 5 to 600 CPS and a specific gravity of 7.3 pounds per gallon (0.87 kilogran's per liter). The adhesive is clear in color, has a medium syrup consistency, and has a flash point of about 35° F. A suitable adhesive may be purchased commercially from Bostik Chemical Division of the Emhart Fastener Group, under the product designation Bostik 7376. In all other respects, this coating material is prepared for use and applied in the same manner as set forth in Example 1.

EXAMPLE 6

Another coating material can be prepared from a single component, solvent based adhesive which comprises a vinyl base carried in a solvent comprising about 91% methylethylketone and about 9% toluene. This adhesive has about 35% total solids, a Brookfield viscosity of about 1000 CPS and a specific gravity of 7.8 pounds per gallon. This adhesive has a flash point of about 20° F., and an appearance which is clear and straw-colored as a liquid, but colorless as a film. A suitable adhesive may be purchased from National Starch And Chemical Corporation, The Adhesives Division, Finderne Avenue, P.O. Box 6500, Bridgewater, NJ 08807, under the product designation Duroflex 30-1278. In all other respects, this coating material is prepared for use and applied in the same manner as set forth in Example 1.

As shown in FIG. 2, in some applications, it is necessary to apply adhesive layer 80 to flap 52 at the job site, rather than at the factory. In such an instance, the layer of adhesive is provided in a roll and secured to a conventional silicone coated release paper 122 having differential release characteristics. A strip of such release paper 122 can be cut from the roll at the job site and applied as illustrated in FIG. 2. The side of release paper 122 having the easy release is disposed so as to face upwardly away from flap 52, while the side of release paper 122 having a tighter release retains the adhesive layer which is applied to flap 52. Thereafter, when it is desired to seal flap 52 to strip 60 on segment 10, release paper 122 can be removed from flap 52, leaving behind adhesive layer 80 secured directly to flap 52 and exposed for application to strip 60.

In such applications, it is desirable to provide the undersurface of flap 52 with a strip 120 of a coating material for attachment of release paper 122 and adhesive layer 80 thereto. Strip 120 extends along the entire length of flap 52 from one end of segment 10 to the other end. The width of strip 120 is in the range of from about 1¼ inches to about 3 inches. Typically, the strip of width 120 is about the same as the width of strip 60 and extends to the outer edge 83 of flap 52. Strip 120 is formed of the same material as is strip 60, preferably, a linear saturated polyester, and it is applied in the same manner as strip 60. The same requirements which apply to strip 60 also apply to strip 120. This embodiment overcomes problems associated with the tendency of the undersurface of flap 52 to absorb moisture from its environment both before and after sealing of flap 52 to the outside surface of paper layer 16 adjacent slit 50, and associated with a textured surface. As previously described with regard to strip 60, the use of strip 122 prevents "fish mouthing" which could result from disintegration of flap 52 on its underside where adhesive layer 80 is secured thereto.

Segment 10 often is used with a plurality of other such segments to insulate a pipe along its length. Exemplary segments 10 and 14 are shown in abutting relationship in FIG. 4 for a section of pipe 12. Segments 10 and 14 abut one another at respective ends 22 and 24. The space between ends 22 and 24 typically is sealed by butt strip tape 20 which is wrapped the circumference of segments 10 and 14 and which is secured to itself by overlapping end 17 with and 19.

In prior art pipe insulation segments, the sealing of abutting ends of insulation segments 10 and 14 using tape 20 is subject to the same difficulties and drawbacks as found in the proper sealing of flap 52. Namely, if paper layer 16 is used, it tends to disintegrate or delaminate if moisture is absorbed, thus destroying the integrity of the seal. If a scrim is present, a poor seal may result. If a PVC coating is provided on the outer surface of segment 10, moisture present can also destroy the integrity of the seal between tape 20 and segment 10. As with flap 50, these problems are overcome by the provision of a strip 62 of coating material at each end of insulation segments 10 and 14. Strip 62 typically extends from respective ends 22 and 24 of segments 10 and 14 inwardly a prescribed distance towards the center of the segments. Strip 62 extends around the entire circumference of segments 10 and 14, including the outer surface of flap 52. The actual width of strip 62 is a function of the width of tape 20, and typically, strip 62 has a width of about two or three inches. Strip 62 is formed of the same material and is applied in the same manner as is strip 60.

A preferred embodiment of butt strip tape 20 is shown in FIGS. 3 through 5. Butt strip tape 20 usually has a structure which is similar to that of segments 10 and 14 so as to be compatible therewith, except that tape 20 includes a thinner fiberglass layer. However, it is not necessary that tape 20 have the same identical structure as segments 10 and 14 and other structures are possible. In the preferred embodiment, as shown in FIG. 3, tape 20 includes a layer 26 of paper, a layer 28 of fiberglass, a metallized layer 30, a layer 32 of a pressure sensitive adhesive, and a layer 54 of release paper. Often, paper layer 26 contains a fiberglass scrim, providing the tape with a textured surface having a raised pattern in accordance with the scrim pattern. Paper layer 26 and fiberglass layer 28 are secured together using laminating adhesive 34, while fiberglass layer 28 and metallized layer 30 are secured together by laminating adhesive 36. Paper layer 26 again is preferably a high intensity, white, chemically treated kraft paper which is flame retardant. Fiberglass layer 28 is made of fiberglass yarns, and typically is woven to form either a tridirectional or diamond patterned weave, or a scrim having a square weave such as a 5×5 scrim. Laminating adhesives 34 and 36 can be any conventional, thermosetting, flame-retardant adhesives which are suitable for laminating fiberglass to paper and to polyester or metal. Layer 30 can be either a layer of aluminum foil, or a layer of a metallized polyester film. Typically, if a metallized polyester film is used, the metal deposited thereon is aluminum. Release paper 54 can be any conventional release paper which is suitable for use with an acrylic adhesive. The adhesive layer typically is an isooctyl, acrylate polymer adhesive, as described in copending U.S. application Ser. No. 804,066.

As illustrated in FIG. 4 and as previously described, when tape 20 is applied to abutting ends 22 and 24 of segments 10 and 14 respectively, one end 17 of tape 20 is secured directly to the outer surface of segments 10 and 14, while the other end 19 of tape 20 overlaps end 17 and is secured to the top surface of tape 20. Paper layer 26 is subject to the same raised surface, disintegration delamination problems as paper layer 16 of segment 10 where end 19 is sealed to end 17. Again, this poses a threat to the integrity of the seal.

The foregoing problem is overcome by the embodiment of the butt strip tape 20 shown in FIGS. 3 through 5. In this embodiment of the invention, butt strip tape 20 is provided in segments cf a premeasured length, which is a function of the circumference of segment 10 with which tape 20 is to be used. The circumference of segment 10 is in turn a function of the diameter of pipe 12 and of the desired thickness of layer 17. Adjacent one end of each segment of tape 20, a strip 66 of a coating material is provided on the outer surface of paper layer. 26 Strip 66 preferably is spaced about 1 inch from the end of the tape segment although it could also extend up to the end of the tape segment. Strip 66 is formed of the same material as strips 60 and 62, preferably a linear saturated polyester, and strip 66 may be applied in the same manner. Preferably, the tape is formed in a continuous length, and an intermittant spray system is used to apply the coating at the proper intervals and widths along its length. The length of tape is later cut into appropriate segments. Strip 66 can be of any width, but typically strip 66 has a width of about two or three inches. Strip 66 is provided on an end of a segment of tape 20 which is to be directly secured to the outer surface of segments 10 and 14.

Another embodiment of the present invention will be described with particular reference to FIGS. 6–8. This embodiment of the invention is shown for use with duct board employed for insulating heating ducts and other similar duct work. Duct board is provided in flat, generally rigid sheets, and typically has a structure as shown in FIG. 8. which is similar to the structure of pipe segment 10 shown in FIG. 1. Duct board 70 typically comprises a flame retardant paper layer 72, a layer 76 of fiberglass yarns, and a metallized layer 74. Typically, the paper layer and the metallized layer are secured to opposite sides of the fiberglass layer 76 with a flame resistant laminating adhesive. Fiberglass layer 76 is formed of a high density fiberglass wool and provides duct board 70 with its desired rigidity. During installation of duct board 70 on a typical duct 78, as shown in FIG. 6, metallized layer 74 generally is positioned to be on the outside surface facing away from duct 78.

FIG. 6 shows the use of duct board 70 in conjunction with a typical duct 78 having a rectangular cross section. With regard to duct 78, top and bottom panels 88 and side panels 86 of duct board 78 are provided. Panels 88 and 86 are trimmed to the appropriate size for use in conjunction with duct 78. Side edge 90 of panel 88 adjoins and is sealed to side edge 92 of panel 86 to provide the desired seal about duct 78. In a typical installation, as shown in FIG..7, edge 90 of panel 88 overlaps edge 92 of panel 86 so that layer 76 of panel 88 remains exposed.

Tape 94 is used to seal together edges 90 and 92. Tape 94 is generally applied from a roll and tape 94 extends in its lengthwise direction along and parallel to edges 90 and 92. This particular application of the tape requires that the tape be creased or folded in its direction of elongation as shown in FIG. 8 so that one half is disposed on edge 90, while another portion thereof is secured to edge 92. Because of its method of manufacture, when folded in this lengthwise direction, tape 94 is less flexible than when folded in its transverse direction. This is because a lengthwise fold is transverse to the machine direction of the tape. As a result, the tape has a tendency to try to retain its original flat condition. When tape 94 is applied, a shear stress thus results along edges 90 and 92 between the tape and the insulation surface to which it is secured.

Metallized layer 74 may collect water by condensation or by direct application before application of tape 94 thereto. As a consequence the bond between tape 94 and layer 74 is weak. Because of the shear stress between tape 94 and paper layer 74, tape 94 has a tendency to release from either edge 90 or edge 92. As a result, a seal is difficult to maintain, especially in humid conditions, and the tape and insulation panels frequently have to be replaced. This problem is aggravated by the fact that the duct board is almost always left in an exposed situation, and frequently is found in basements or other locations where the moisture content of the air is high.

The foregoing problem is overcome by the provision of a strip 96 of coating material disposed on metallized layer 74 along the lateral edges of panel 86, and a similar strip 98 of coating material disposed on metallized layer 74 along the lateral edges of panel 88. Strips 96 and 98 are formed of the same material as are strips 60 and 62 of segment 10, which is preferably a linear saturated polyester. Strips 96 and 98 are also applied in the same manner as are strips 60 and 62. Ideally, the width of strips 96 and 98 is sufficient to accommodate the entire width of tape 94 when used in the arrangement shown in FIG. 8. A typical width is two to three inches.

Tape 94 is also used to seal the spaces between abutting longitudinal ends 99 of panels 86 and 88. Tape 94 typically is wrapped all the way around the perimeter of duct 78. Although the tendency for the tape to come loose at such a joint is not as great as along edges 90 and 92, because the tape is folded only transversely or parallel to the machine direction, a poor bond due to dirt or moisture may still allow tape 94 to eventually release from the surface of panels 86 and 88. Therefore, in an alternative embodiment, a strip 100 of coating material is provided along the edge of each longitudinal end 99 of each panel 86 and 88. Strips 100 are formed of the same material and applied in the same manner as are strips 96 and 98.

The provision of strips 96, 98 and 100 along the edges of side and longitudinal ends respectively of duct board panels 86 and 88 allow the panels to be firmly and tightly sealed to one another at their edges using tape, and permit the creation of a high integrity seal about duct 78. The integrity of this seal will not be compromised by moisture or dirt, and the seal should last as long as the insulation panels 86 and 88. As a result, there is no need for frequent replacement of panels 86 and 88.

A further embodiment of the present invention will be described with particular reference to FIG. 9. This embodiment of the invention is shown in conjunction with a blanket insulation 126 which is employed for insulating heating ducts and other similar duct work. Blanket insulation 126 is provided in rolls, and is generally highly flexible. Blanket insulation 126 typically has the same structure as duct board, as shown in FIG. 8 and typically comprises a flame retardant paper layer 128, a layer of loosely woven fiberglass yarns 130, and a metallized layer 132. Typically, the paper layer and the metallized layer are secured to opposite sides of fiberglass layer 130 with a flame resistant laminating adhesive. However, metallized layer 132 may be disposed between paper layer 128 and fiberglass layer 130. Fiberglass layer 130 is formed of a low density fiberglass wool and allows blanket insulation 126 to have the desired flexibility. During installation of blanket insulation 126 on a typical duct (not shown), either paper layer 128 or metallized layer 132 may be positioned to be on the outside surface facing away from the duct.

During the installation of typical blanket insulation, as described in U.S. application Ser. No. 905,701, filed Sept. 9, 1986, and assigned to the assignee of the present application, lateral edges of the blanket insulation are placed in side by side relation along a duct and are secured together using segments of tape, such as those shown in FIGS. 3-5. This seal is subject to compromise because of moisture or dirt, as previously described for similar insulation structures. This problem is overcome by providing a strip 134 of a coating material along the lateral edges of the entire roll of blanket insulation 126 either on paper layer 128 or on metallized layer 132. This strip 134 of a coating material has the same composition as strip 60, and is applied in the same manner.

The tape segments used to seal edges 136 of adjoining segments of blanket insulation typically overlap one another in an end to end relation. Therefore, tape segments having a layer of a coating material at one end on the paper layer, such as those shown in FIGS. 3-5, are preferably used, so that the overlapping portions of the segments are secured tightly to one another, and do not suffer from the problems of delamination and disintegration of the paper layer.

The linear saturated polyester material used for forming the strips on each of the embodiments of this invention is ideally suited for such a use because it contains all of the required properties. It is moisture resistant, flexible, flexible at high or low temperatures, it will bond to pressure sensitive adhesives, it is absorbed by paper, it will adhere to paper, PVC or a metallized surface, it is clear, it has no static cling, and it does not remain sticky once it has been cured, and it provides a flat, smooth surface to which an adhesive wi)1 bond over its entire surface.

This invention overcomes serious problems with the use of tape systems in pipe and duct insulation applications. This invention allows the creation of a seal of high integrity which need not be repaired or replaced for long periods of time and which meets existing United States Government specifications.

Modifications and improvements will occur within the scope of this invention to those skilled in the art, and the above description is intended as exemplary only.

The scope of this invention is defined only by the following claims and their equivalents.

What is claimed is:

1. A pressure sensitive adhesive tape for use in securing together segments of insulation, said tape comprising:
   an upper layer;
   a lower layer formed of a pressure sensitive adhesive; and
   a strip of a water resistant, non-tacky coating material disposed on said upper layer adjacent one end thereof and comprising a cured adhesive, said coating material being capable of bonding to the pressure sensitive adhesive of said lower layer.

2. A pressure sensitive adhesive tape as recited in claim 1 wherein said strip of coating material is disposed only adjacent one end of said tape on said upper layer, the remainder of said upper layer being free of said coating material.

3. A pressure sensitive adhesive tape as recited in claim 1 further comprising a layer of fiberglass disposed between said upper layer and said lower layer.

4. A pressure sensitive adhesive tape as recited in claim 1 further comprising a metallized layer disposed between said paper layer and said lower layer.

5. A pressure sensitive adhesive tape as recited in claim 1 wherein said coating material is flexible within the range of temperatures of from about 150° F. to about −20° F.

6. A pressure sensitive adhesive tape as recited in claim 1 wherein said upper layer is comprised of paper.

* * * * *